US009728207B2

(12) United States Patent
Gangmei et al.

(10) Patent No.: US 9,728,207 B2
(45) Date of Patent: Aug. 8, 2017

(54) WRITE POLE MAGNETIC GUARD

(71) Applicant: Seagate Technology LLC, Cupertino, CA (US)

(72) Inventors: Prim Gangmei, Londonderry (GB); Swaraj Basu, Londonderry (GB); Angela Moore, Redcastle (IE); Muhammad Asif Bashir, Londonderry (GB); Praphaphan Wipatawit, Samutprakam (TH); Mark Anthony Gubbins, Letterkenny (IE); Marcus B. Mooney, Quigley Point (IE); Sharon Hammant, Letterkenny (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/976,660

(22) Filed: Dec. 21, 2015

(65) Prior Publication Data

US 2016/0180866 A1 Jun. 23, 2016

Related U.S. Application Data

(60) Provisional application No. 62/096,176, filed on Dec. 23, 2014.

(51) Int. Cl.
*G11B 5/127* (2006.01)
*G11B 5/31* (2006.01)

(52) U.S. Cl.
CPC .......... *G11B 5/3116* (2013.01); *G11B 5/1278* (2013.01); *G11B 5/315* (2013.01)

(58) Field of Classification Search
CPC ...... G11B 5/1278; G11B 5/3116; G11B 5/315
USPC ......................................... 360/125.12, 125.3
See application file for complete search history.

(56) References Cited

U.S. PATENT DOCUMENTS

| 7,436,634 | B2 | 10/2008 | Carey et al. |
| 8,120,874 | B2 | 2/2012 | Hsiao et al. |
| 8,369,048 | B2 | 2/2013 | Miyauchi et al. |
| 8,922,951 | B2 | 12/2014 | Sapozhnikov et al. |
| 8,970,992 | B2 | 3/2015 | Benakli et al. |
| 2008/0198507 | A1* | 8/2008 | Maruyama ............ G11B 5/112 360/123.01 |
| 2014/0078618 | A1* | 3/2014 | Matsumoto ............ G11B 5/314 360/99.08 |

* cited by examiner

*Primary Examiner* — Carlos E Garcia
(74) *Attorney, Agent, or Firm* — Hall Estill Attorneys at Law

(57) ABSTRACT

A data storage system may have at least one data writer that incorporates a write pole that continuously extends from an air bearing surface. The write pole can be separated from the air bearing surface by a side shield that consists of a first magnetic layer positioned on the air bearing surface and a guard layer separated from the air bearing surface by the first magnetic layer. The guard layer may be configured with a different magnetic saturation flux density than the first magnetic layer.

19 Claims, 5 Drawing Sheets

WRITE POLE MAGNETIC GUARD

RELATED APPLICATION

The present application makes a claim of domestic priority under 35 U.S.C. §119(e) to U.S. Provisional Application No. 62/096,176 filed Dec. 23, 2014, the contents of which are incorporated by reference.

SUMMARY

A data writer, in accordance with various embodiments, has a write pole that continuously extends from an air bearing surface. The write pole is separated from the air bearing surface by a side shield that consists of a first magnetic layer positioned on the air bearing surface and a guard layer separated from the air bearing surface by the first magnetic layer. The guard layer is configured with a similar or dissimilar magnetic saturation flux density compared to the first magnetic layer.

DETAILED DESCRIPTION

As data storage systems are configured to provide greater data storage capacity, the physical size and proximity of various data accessing components are reduced. For example, magnetic materials utilized to shield stray magnetic fields are physically smaller and closer to other magnetic materials that conduct data access operations, such as data writing. Such reduction in size and proximity can correspond with increased magnetic volatility that jeopardizes the accuracy and speed of data accesses as well as the integrity of data positioned proximal to data being accessed. Hence, there is an interest in data storage systems with reduced physical dimensions and increased magnetic stability that leads to optimized data access performance.

A data writer, in view of these and other issues, can be arranged with a write pole and a side shield separated from the write pole. The write pole may continuously extend from an air bearing surface and the side shield may consist of a first magnetic layer positioned on the air bearing surface and a guard layer separated from the air bearing surface by the first magnetic layer. By tuning the material, size, and position of the guard layer, such as by constructing the second magnetic layer with a different magnetic saturation flux density than the first magnetic layer, the shield can have optimized magnetic gradients that are magnetically stable despite small physical size and proximity to other magnetic materials. The ability to tune different magnetic shields in a data writer with first and second magnetic layers that respectively have increased magnetic stability optimizes at least the writing of data.

Figure 1:
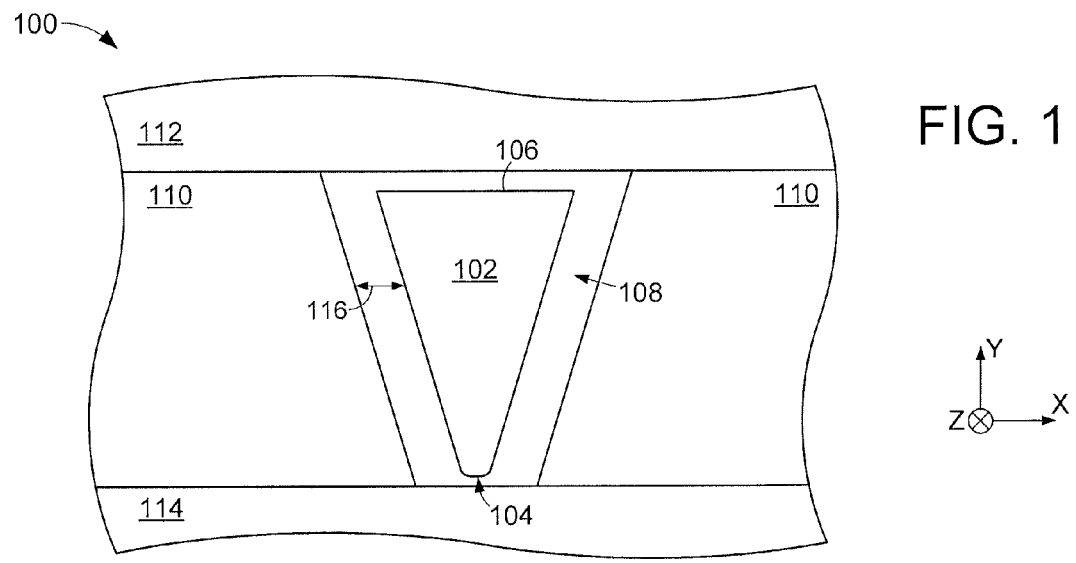
FIG. 1 is an air bearing view block representation of a portion of an example data writer arranged in accordance with various embodiments.

Although it is contemplated that various embodiments of the present disclosure may be employed in data accessing components other than a data writer, such as a solid-state memory array and data reader, assorted embodiments tune one or more shields of a data writer to provide increase data storage performance. FIG. 1 is an air bearing surface (ABS) view block representation of a portion of an example data writer 100 tuned in accordance with some embodiments. The data writer 100 has a write pole 102 that has a trapezoidal shape on the ABS that defines a leading tip 104 and a trailing edge 106 in view of when data bits are encountered by the write pole 102.

One or more continuous magnetic shields are separated from the write pole 102 by a non-magnetic insulating material 108 and can be tuned to any size and profile on the ABS to complement the shape of the write pole 102. In the example shown in FIG. 1, the write pole 102 is disposed laterally between side shields 110 along the X axis and parallel a cross-track direction with respect to encountered data tracks. The write pole 102 is further disposed between trailing 112 and leading 114 shields aligned along the Y axis with a longitudinal axis of the write pole 102. It is contemplated that the leading shield 114 is omitted from the data writer 100 to allow the side shields 110 to respectively extend uptrack, along the Y axis, from the leading tip 104, such as with a box shield that continuously extends around the leading tip 104 to span opposite sides of the write pole 102.

The proximity of the write pole 102 to the respective shields 110, 112, and 114 can be characterized as a gap distance 116 that may be tuned to be uniform or varying to balance magnetic shielding with the risk of inadvertent magnetic shunting. That is, the gap distance 116 on the ABS can be tuned to increase or reduce the proximity of magnetic material to the write pole 102, which can shield magnetic fields without inducing shunting on the ABS that can degrade data writing performance for the data writer 100 by inducing magnetic volatility and decreasing the amount of magnetic flux emanating from the write pole 102. Despite tuning the gap distance 116, shield materials, and shield configurations on the ABS, the physical proximity of the shields 110 and 112 to the lateral sidewalls 118 and leading edge 106 of the write pole 102, distal the ABS, can result in magnetic saturation of the shields that is magnetically volatile, increases magnetic shunting risk, and decreases data writing field gradient to the detriment of data writer 100 performance.

Figure 2:
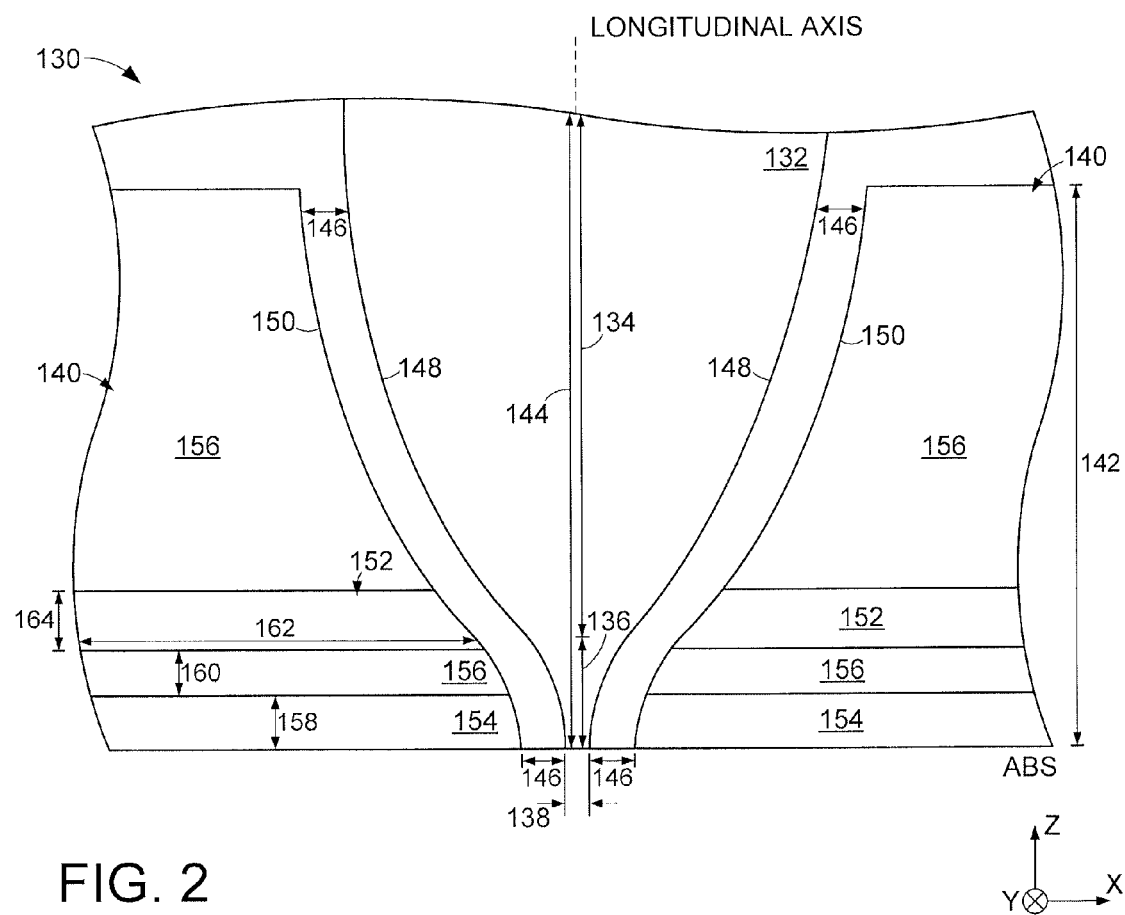
FIG. 2 illustrates a top view block representation of a portion of a data writer configured in accordance with some embodiments.

FIG. 2 illustrates a top view block representation of a portion of an example data writer 130 configured in accordance with various embodiments to optimize shielding performance by mitigating magnetic volatility on the ABS. The data writer 130 has a write pole 132 that can be positioned uptrack or downtrack from at least one return pole. The write pole 132 is configured with a substantially T-shape that corresponds with a wider body portion 134 that tapers to a tip portion 136 with a smaller width 138 to accumulate magnetic flux at the ABS for efficient delivery to a predetermined portion of an adjacent data storage medium. The shaped configuration of the write pole 132 can be complemented by similarly shaped side shields 140 positioned on opposite lateral sides of the write pole 132 and continuously extending from the ABS to a stripe height 142 that may be the same, smaller, or greater than the stripe height of the write pole 132, as defined by the combined lengths of the body 134 and tip 136 portions and labeled 144.

As shown, each side shield 140 is separated from the write pole 132 by a uniform gap distance 146 that is filled with non-magnetic material and continuously extends from the ABS throughout the side shield stripe height 142. The uniform gap distance 146 can be attributed to matching pole 148 and shield 150 sidewalls. It can be appreciated that tuning the sidewalls 148 and 150 to be different can create a varying gap distance 146 that corresponds with increasing amounts of non-magnetic material being positioned between the write pole 132 and side shields 140 at various points along the strip height 142.

While various embodiments utilize varying gap distances 146 to tune the magnetic shielding and risk of shunting in the data writer 130, configuring the respective side shields 140 of a single continuous layer of magnetic material, such as NiFe or CoFe alloys, can become magnetically saturated. Such saturation can degrade data writer 130 performance and increase the risk of data erasure as magnetic fields are inadvertently emanated from the shields 140 to erase the programmed magnetic polarity of at least one data bit, also known as adjacent track interference (ATI) and bits in side tracks that is known as side track erasure (STE).

Accordingly, at least one side shield 140 can be tuned to incorporate a magnetic guard layer 152 that is separated from the ABS and a first magnetic layer 154 by a non-magnetic layer 156. The tuned configuration of the guard layer 152 serves to mitigate excess magnetic flux from saturating the side shield 140, as a whole. The guard layer 152 may further reduce the risk of ATI by being tuned with respect to the first magnetic layer 154 to customize the stripe height 158 of the first magnetic layer 154, the length 160 of the non-magnetic layer 156, and the width 162 of the guard layer 152. That is, the position, material, and relationship of the guard layer 152 with the ABS and first magnetic layer 154 can provide an optimized balance of magnetic shielding, isolation, and stability.

In some embodiments, the guard layer 152 is tuned with a material that differs from the first magnetic layer 154. The different materials can provide differing magnetic saturation flux densities ($B_S$) in the side shields 140 that can cater to differing data storage environments by providing different levels of magnetic saturation efficiency. In other words, the tuned shape, material, and position of the guard 152 and first magnetic 154 layers can provide stable magnetic shielding while mitigating the risk of ATI and STE by conducting excess magnetic flux away from the ABS and write pole 132. It is noted that the non-magnetic layer 156 may consist of one or more sub-layers and materials that have a shape and extent from the ABS that optimizes shielding while providing efficient data writer 130 fabrication.

Figure 3:
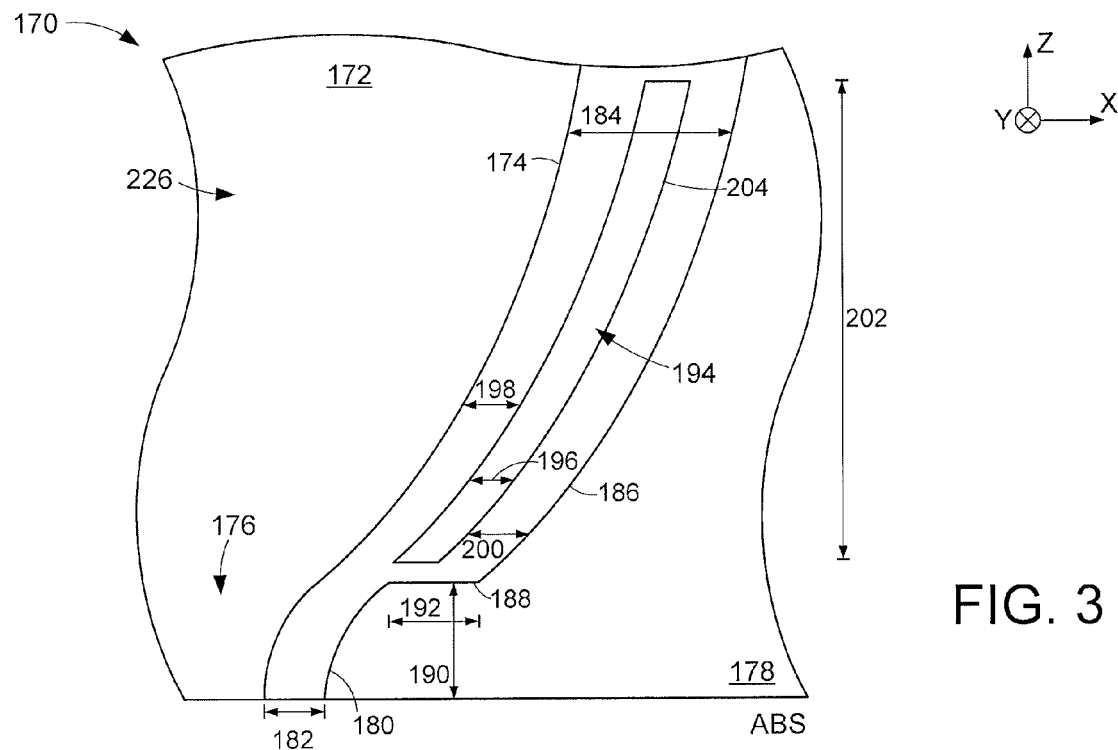
FIG. 3 shows a top view block representation of a portion of an example data writer organized in accordance with various embodiments FIG. 4 displays a top view block representation of a portion of an example data writer constructed and operated in accordance with assorted embodiments.

It is noted that the guard layer 152 has a substantially rectangular shape in the example embodiment of FIG. 2 that is defined by the height 158 of the guard layer 152 being greater than the length 164. However, a rectangular shape is not required or limiting. FIG. 3 displays a top view block representation of a portion of an example data writer 170 arranged in accordance with various embodiments to provide tuned magnetic shielding, magnetic stability, and data writing performance. The data writer 170 has a write pole 172 configured with a sidewall 174 defining a portion of a tip 176 at the ABS. A side shield 178 is positioned on the ABS and tuned with a first shield sidewall 180 that extends from the ABS to provide a first uniform gap distance 182.

In contrast to the single uniform gap distance 146 shown in FIG. 2, the side shield 178 is tuned to provide two different gap distances 182 and 184 by matching the shape of the write pole sidewall 174 with the shape of the first 180 and second 186 shield sidewalls. The differing gap distances 182 and 184 correspond with a transition surface 188 that is separated from the ABS by distance 190 and has a length 192 along the X axis that is the difference between the gap distances 182 and 184. Through the tuning of the position and size of the transition surface 188, such as the parallel angle of the surface 188 with respect to the ABS, allows the two different gap distances 182 and 184 to provide increased shielding proximal the ABS and reduced risk of shunting distal the ABS.

While the varying gap distances 182 and 184 can allow increased mechanisms for tuning the shielding and write performance of the data writer 170, configuring the side shield 178 as a single layer of a material can be prone to magnetic saturation, increased shunting, and ATI, particularly when the data writer 170 is constructed on a nanometer scale. Such issues have rendered the incorporation of a magnetic guard layer 194 in the larger gap distance 184. The magnetic guard layer 194 can have a uniform or varying width 194 and can be tuned for position, as defined by separation distances 198 and 200 as well as length 202. That is, the magnetic guard layer 194 can be tuned for size and position to be in contact with, or separated from, the second shield sidewall 186 and the transition surface 188 to protect the side shield 178 from unwanted saturation.

The magnetic guard layer 194 may have sidewalls 204 that are similar or dissimilar from the pole 174 and second shield 186 sidewalls, respectively, to provide differing volumes of the guard layer material at different locations from the ABS. In some embodiments, the magnetic guard layer 194 is constructed of a magnetic material with approximately a 2.4 T magnetic flux density that is greater than the material of the side shield core 178. The increased magnetic flux density of the magnetic guard layer 194 allows the guard to saturate before the side shield core 178 and subsequently dissipate the saturated magnetic flux without affecting write pole 172 data writing performance due to the small relative size of the guard layer 194.

It is contemplated that the magnetic guard layer 194 extends to the ABS to occupy portions of the first 182 and second 184 gap distances, but such configuration is not required or limiting. The ability to tune the position, size, and material of the magnetic guard layer 194 allows the side shield core 178 to be increasingly isolated from the write pole 172, which optimize data writing performance by providing shielding with mitigated risk of side shield magnetic saturation and ATI and STE. The surrounding of the magnetic guard layer 194 with non-magnetic insulating material can further optimize data writing performance by ensuring magnetic saturation of the guard layer 194 does not result in magnetic saturation and volatility in the side shield core 178.

Figure 4:
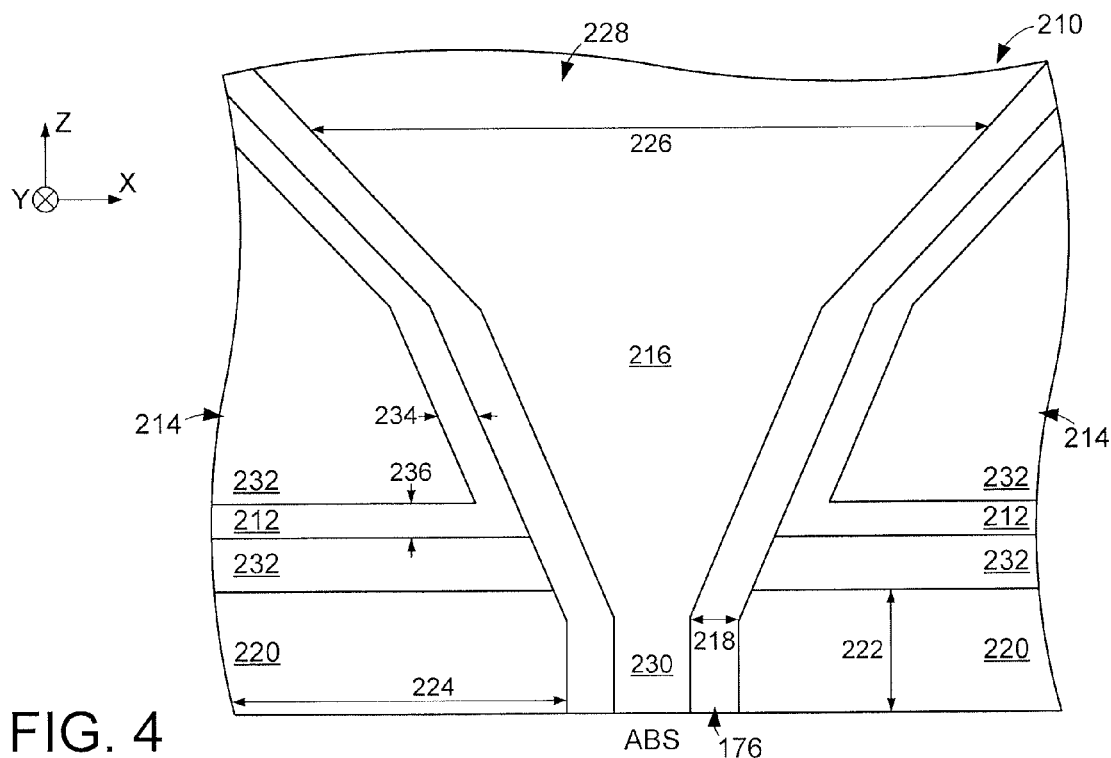

As shown in FIGS. 2 and 3, a magnetic guard layer can be positioned in a variety of different orientations with respect to a side shield and write pole. FIG. 4 illustrates a top view block representation of a portion of an example data writer 210 arranged with a magnetic guard layer 212 continuously extending along orthogonal inside the head (Z axis) and cross-track (X axis) directions. The magnetic guard layer 212 is incorporated into a side shield 214 that is positioned on the ABS, proximal to the write pole 216, and separated from the write pole 216 by a uniform gap distance 218. The side shield 214 has a magnetic ABS layer 220 that continuously extends to a continuous stripe height 222 (Z axis) with a width 224 (X axis) on the ABS that is greater than the crosstrack length 226 of the write pole body 228.

The size, shape, and material of the ABS layer 220 can be tuned to provide increased shielding at the ABS, proximal the write pole tip 230, without unduly increasing the risk of shunting and side shield 214 magnetic saturation. That is, the tuned configuration of the ABS layer 220 can position magnetic material proximal the write pole tip 230 to provide ample shielding without being large enough to increase the risk of shunting and magnetic saturation conditions that can degrade data writer 210 performance. While the ABS layer 220 can provide shielding at the ABS, the write pole 216 can saturate the side shield 214 distal the ABS. Hence, the guard layer 212 is configured to continuously extend along cross-track (X axis) and inside the head (Z axis) directions relative to the write pole 216.

Positioning the magnetic guard layer 212 in the substantially L-shaped configuration with non-magnetic material 232 separating the guard layer 212 from the ABS layer 220 allows the guard layer 212 to magnetically protect the ABS layer 220 from saturation, which can be complemented by tuning the saturation flux density of the guard layer 212 to be greater than the ABS layer 220. In some embodiments, the guard layer 212 is tuned for shape and size to provide different amounts of guard layer material extending cross-track or downtrack. For example, thickness 234 of the guard layer 212 distal the ABS and insider the writer, as measured along the X axis and parallel to the cross-track direction, can be different than the thickness 236 of the cross-track portion of the guard layer 212, as measured along the Z axis into the writer. It is noted that other embodiments arrange the guard layer thicknesses 234 and 236 to be the same to provide a uniform guard layer 212 thickness.

Figure 5:
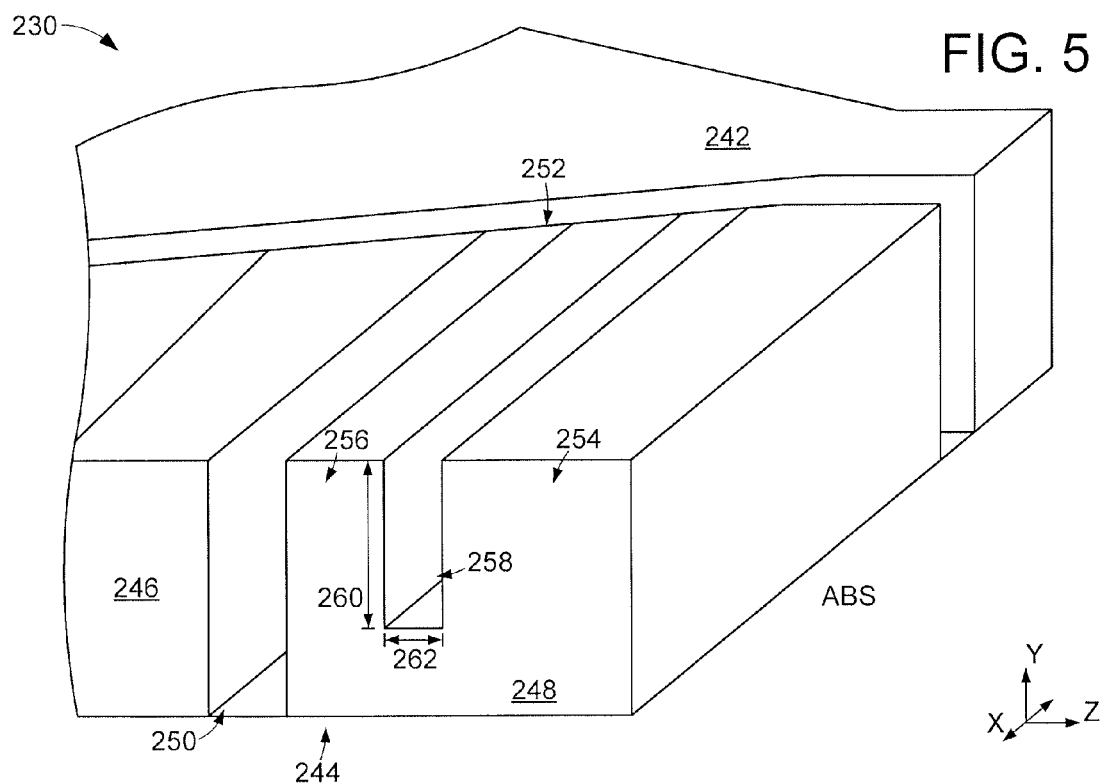
FIG. 5 conveys an isometric view block representation of a portion of an example data writer configured in accordance with some embodiments.

The ability to tune the side shields 214 to incorporate any number of magnetic and non-magnetic layers arranged in unlimited sizes, shapes, and positions allows the data writer 210 to provide optimal shielding without increasing the risk of conditions, like ATI, that can degrade performance. FIG. 5 displays an isometric view block representation of a portion of an example data writer 240 that is configured with a write pole 242 proximal to a side shield 244 on the ABS. The side shield 244 has a magnetic guard layer 246 separated from the ABS by a magnetic ABS layer 248 and a non-magnetic layer 250 that each continuously extend laterally away from a side shield sidewall 252.

Although any magnetic layer of the side shield 244 can be arranged to have a continuously rectangular cross-section, such as guard layer 246 shown in FIG. 5, various embodiments divide the ABS layer 248 into front side shield 254 and rear guard layer 256 portions by constructing a notch 258 that continuously extends from the shield sidewall 252. The notch 258 may be configured in uniform and non-uniform shapes and sizes that can be, for example, curvilinear, linear, and combinations of the two. The tuning of the depth 260 and width 262 of the notch 258 can control how the ABS layer 248 shields magnetic flux and mitigates magnetization saturation. For instance, the notch 258 can be constructed with a varying depth 260 and uniform width 262 to promote the establishment of magnetic domains that provide optimal shielding and increased ease of manufacturing compared to completely separating the side shield 254 and guard layer 256 portions.

It is contemplated that the notch 258 is filled with a non-magnetic material. However, some embodiments may dispose a magnetic material in the notch that is different than the material of the ABS layer 248, such as the guard layer 246 material. With the tuning capabilities associated with the side shields of FIGS. 2-5, a diverse variety of data writing environments can be accommodated through tuning the ABS and guard layers for position, size, and material. In yet, the side shields of a data writer are not exclusive to the incorporation of a magnetic guard layer.

Figure 6:
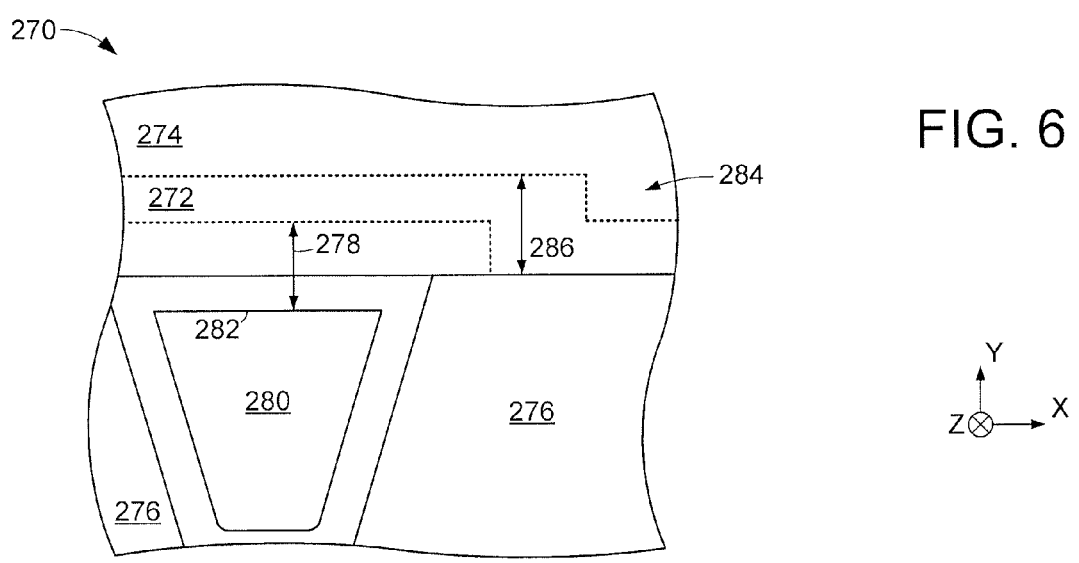
FIG. 6 shows an ABS view of a portion of an example data writer arranged in accordance with assorted embodiments.

FIG. 6 shows an ABS view block representation of a portion of an example data writer 270 configured with a magnetic seed layer 272 disposed between a trailing shield 274 and a side shield 276 distal the ABS, as illustrated by segmented lines. The magnetic seed layer 272 is arranged to provide an increased separation distance 278 between the write pole 280, which can aid in mitigating shunting between the write pole 280 and the trailing shield 274 along the trailing edge 282. The trailing separation distance 278 can be provided by shaping the magnetic seed layer 272 and trailing shield layer 274 with a letterbox region of increased thickness 286, as measured along the Y axis.

Figure 7:
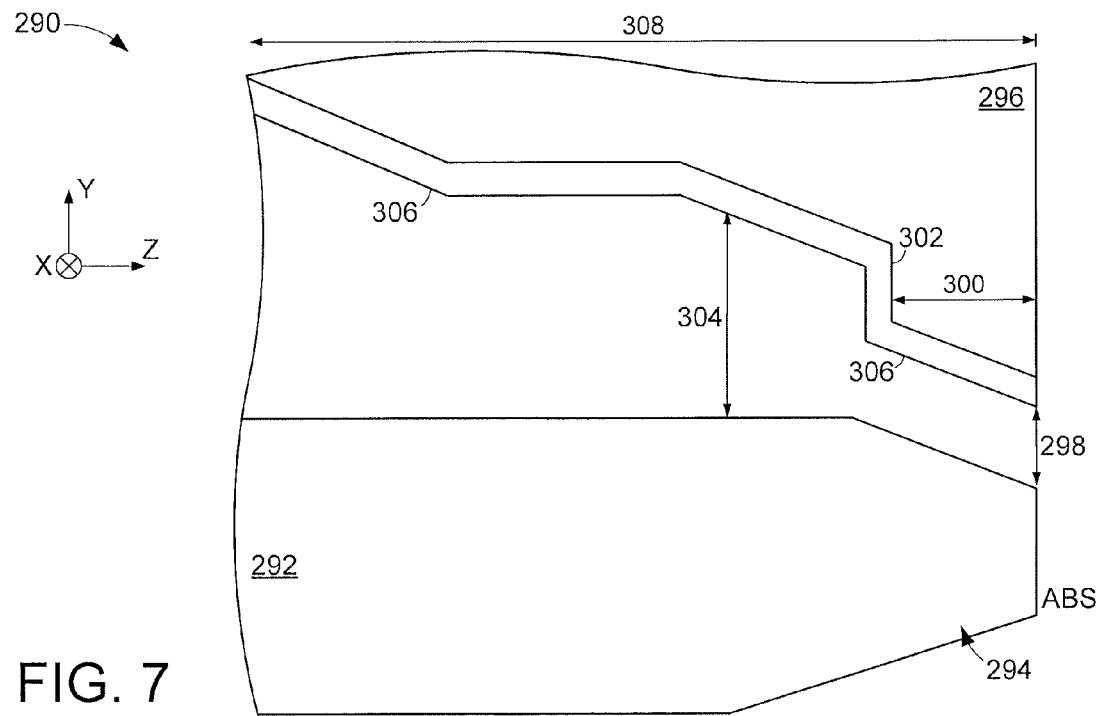
FIG. 7 is a cross-sectional block representation of a portion of an example data writer configured in accordance with various embodiments.

Despite the tuning of the guard layer 272 for thickness and separation distance 278 on the ABS, the relatively high magnetic flux associated with the write pole 280 can saturate the side 276 and trailing 274 shields distal the ABS. Accordingly, the trailing shield 274 can be arranged to provide a balance between shielding and saturation distal the ABS. FIG. 7 conveys a cross-sectional block representation of a portion of an example data writer 290 configured in accordance with various embodiments to provide optimal shielding and data writing performance. The data writer 290 has a write pole 292 that tapers to a write pole tip 294 at the ABS.

As shown, the trailing shield 296 is arranged to provide a uniform non-magnetic gap distance 298 that continuously extends from the ABS to a stripe height 300 where a transition surface 302 increases the gap distance 298 distal the ABS. The increased gap distance 304 can be uniform or varying to mitigate inadvertent magnetic shunting and trailing shield saturation while gap distance 298 provides ample shielding of stray magnetic flux on the ABS. However, the simple incorporation of the increased gap distance 304 in the trailing shield 296 may not be enough to prevent unwanted shield saturation. Therefore, the magnetic seed layer 306 can separate the trailing shield 296 from the write pole 292.

It is contemplated that the seed layer 306 is separated from the trailing shield 296, such as layer 194 of FIG. 3. However, various embodiments arrange a first magnetic guard layer 306 to contact the trailing shield 296 continuously along portions of its stripe height 308. The seed layer 306, in some embodiments, may not continuously span the transition surface 302 while other embodiments configure the seed layer 306 to have a uniform thickness continuously from the ABS to the stripe height of the trailing shield 296. Through the tuned material, position, and thickness of the seed layer 306, the increased gap distance 304 configuration of the trailing shield 296 can be complemented to provide optimized data writing performance.

Figure 8:
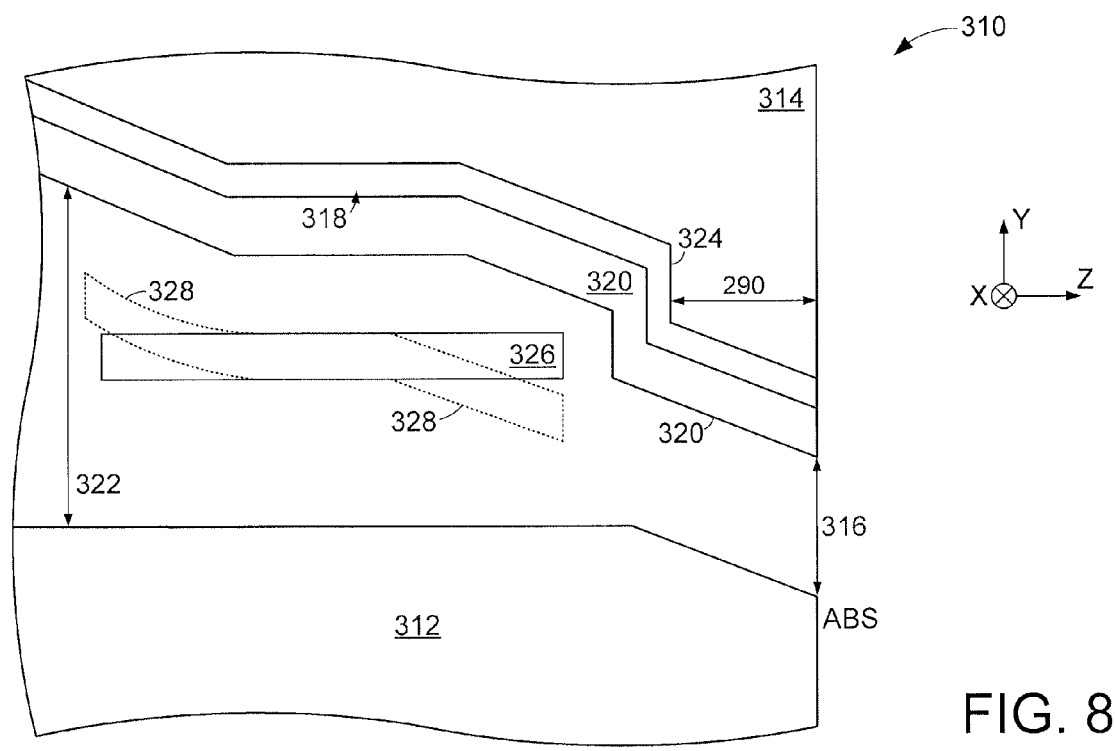
FIG. 8 shows a cross-sectional block representation of a portion of an example data writer organized in accordance with some embodiments.

FIG. 8 is a cross-sectional block representation of a portion of an example data writer 310 constructed and operated in accordance with some embodiments. The data writer 310 has a write pole 312 separated from a trailing shield 314 on the ABS by an insulating write gap having a uniform gap distance 316 defined by first 318 and second 320 seed layers. The ability to tune the respective seed layers 318 and 320 for thickness along the Y axis, position, and material allows magnetic flux to be controlled without saturating the trailing shield 314. That is, the seed layers 318 and 320 can be constructed of materials with different magnetic moments, saturation flux densities, and uniaxial anisotropies to provide a graded trailing shield 314 magnetic profile.

It is contemplated that the first 318 and second 320 seed layers are respectively magnetic or non-magnetic materials that are different. However, the tuned configuration of the seed layers 318 and 320 in combination with the increased gap separation distance 322 provided by the transition surface 324 may not be sufficient to mitigate magnetic saturation in the trailing shield 314. Thus, a magnetic guard layer 326 can be positioned in the greater separation distance 322 to provide additional shield saturation protection. The guard layer 326 can be arranged, in various embodiments, with uniform or varying thicknesses along the Y axis, parallel to the ABS with non-magnetic material surrounding the guard layer 326.

As illustrated by the solid lines of layer 326, the guard layer 326 can be configured as a continuously linear orientation with respect to the ABS. At least a portion of the guard layer 326 can be linearly or curvilinearly angled with respect to the ABS to separate the write pole 312 from the magnetic material of the guard layer 326 distal the ABS, as shown by segmented line 328. The ability to tune the guard layer 326 to various sizes, shapes, materials, and positions relative to the trailing shield 314 and write pole 312 allow the data writer 310 to have increasingly robust trailing shield saturation protection in combination with optimal shielding at the ABS.

Figure 9:
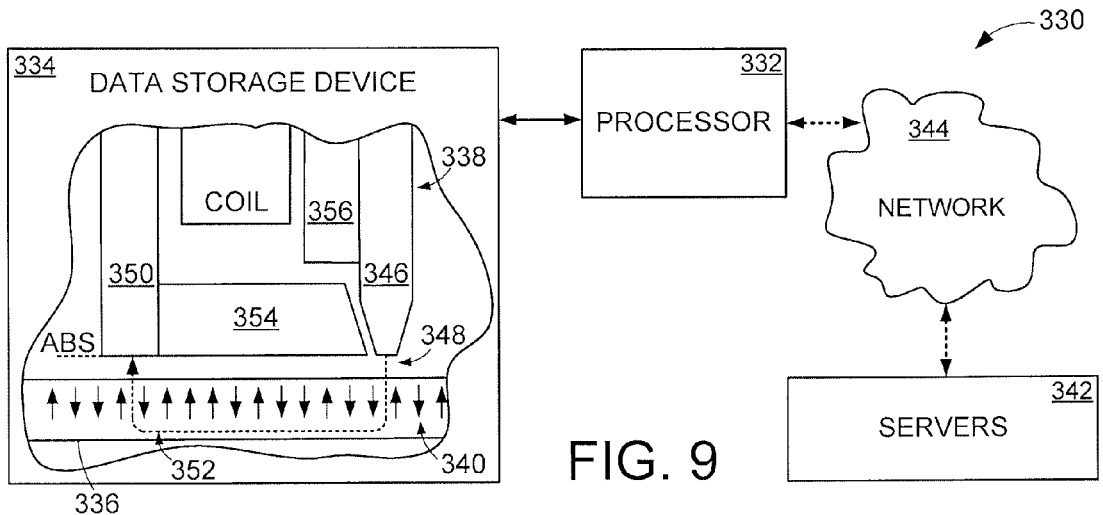
FIG. 9 conveys a block representation of an example data storage system in which various embodiments may be practiced.

FIG. 9 shows a block representation of an example data storage environment 330 configured to utilize tuned data writer in accordance with various embodiments. The environment 330 has at least one processor 332, or controller, that communicates with and controls one or more data storage devices 334 individually or simultaneously. The data storage device 334 can be constructed and operated with at least one data storage medium 336, which is accessed by one or more data transducers 338, to store and read data in the form of data bits 340.

Assorted embodiments may package the processor 332 within the data storage device 334, while other embodiments utilize multiple processors 332 internal and external to the data storage device 334. The use of one or more local processors 332 can allow multiple data storage devices 334 to be employed as part of a local data storage scheme. The ability for the processor 332 to communicate to remote hosts 342, such as other devices, nodes, and servers, over a wired or wireless network 344 via appropriate protocol, allows for other data storage schemes like redundant array of independent disks (RAID) and data caching, while providing increased computing capabilities. It should be noted that the network 344 can connect the local processor 332 to an unlimited variety and number of computing components, without limitation. As such, the data storage environment 330 can be tuned to utilize a diverse range of computing components to provide virtually any type of data storage capability, such as cloud computing, virtual machines, and redundant storage arrays.

In the partial cross-sectional view of a data writer portion of the data storage device 334, the ability of a main write pole 346 to emit magnetic flux across an ABS gap 348, through the data storage medium 346 to a return pole 350 in a circuit 352, allows at least one data bit 340 to be programmed in a perpendicular orientation to the data storage medium 336 with a predetermined polarity. The linear data bit resolution of the data writer portion may be increased by placing a magnetic shield 354 between the main 346 and return 350 poles, but the proximity of the shield 354 to the main write pole 346 may induce magnetic shunting that decreases the effective magnetic field, and magnetic saturation provided by the coil and yoke 356. The reduction in physical and magnetic size of the various aspects of the data writer portion 350 can induce a variety of data programming difficulties, such as increased magnetic noise and reduced cross-track magnetic field gradient that degrade the areal density capacity of the data storage device 334.

Figure 10:
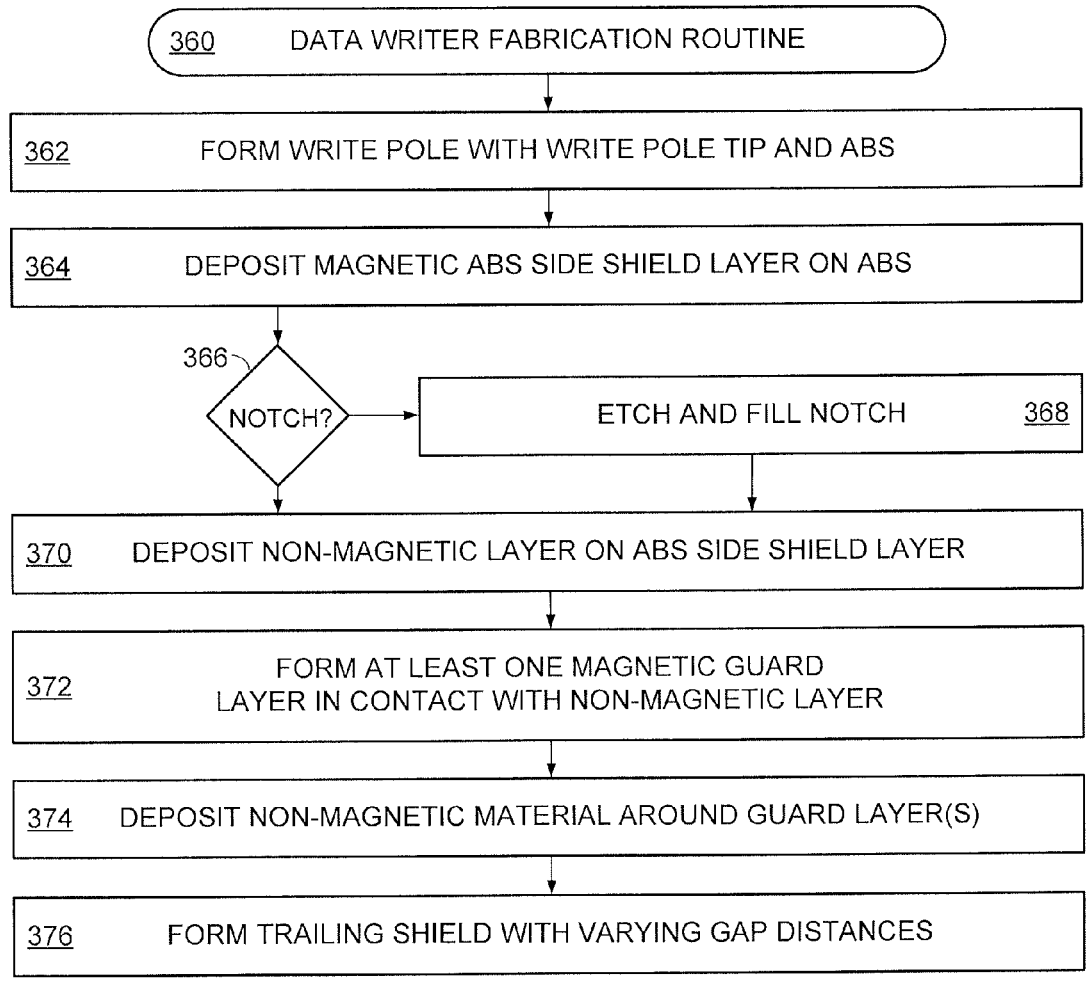
FIG. 10 provides a flowchart of an example writing element fabrication routine carried out in accordance with assorted embodiments.

Although a data storage system can be configured with an unlimited variety of data storage devices constructed and operated in a diverse variety of manners, assorted embodiments utilize the example data writer fabrication routine 360 of FIG. 10 to manufacture at least one data writing means of a data storage device. Initially, routine 360 begins by forming a write pole in step 362. The write pole may have one or more tapered surfaces that reduce the size of the write pole towards an ABS. Step 364 deposits a magnetic ABS side shield layer on an ABS and separated from the write pole by a non-magnetic gap distance.

The ABS side shield layer can have a cross-track width on the ABS, in some embodiments, that is greater than the cross-track extent of the write pole. Regardless of the configuration of the ABS side shield layer, decision 366 evaluates if a notch is to be incorporated into the ABS side shield to partially separate the side shield from a guard layer, as illustrated in FIG. 5. If a notch is chosen, step 368 proceeds to etch the notch and fill it with magnetic or non-magnetic material. In the event no notch is chosen or at the conclusion of the formation of the notch in step 368, step 370 deposits a non-magnetic layer in contact with the ABS side shield layer. It is contemplated that steps 364 and 370 can combine to form a transition surface that increases the gap distance between the write pole and the side shield.

With the side shield having the ABS shield layer and non-magnetic layer formed, step 372 determines a configuration for at least one magnetic guard layer that is formed in contact with the non-magnetic side shield layer. The side shield is completed in step 374 by depositing non-magnetic material in contact with the magnetic guard layer(s) up to a predetermined stripe height. It is contemplated that routine 360 could terminate with the formation of a single magnetic trailing shield. However, various embodiments proceed to form a trailing shield in step 376 with varying gap distances and at least one magnetic guard layer positioned between the write pole and trailing shield, distal the ABS.

It can be appreciated that routine 360 can produce a tuned side and trailing shields either collectively or individually that provide optimized shielding and saturation mitigation distal the ABS. The ability to tune the number, size, and position of the magnetic guard layers of the side and trailing shield allows for increased magnetic gradient away from the write pole along both cross-track and downtrack directions. It is noted, however, that the various steps and decisions of routine 360 are not required or limiting and any aspect can be changed or removed just as anything can be added to the routine 360 at will.

While the embodiments have been directed to magnetic programming, it will be appreciated that the claimed technology can readily be utilized in any number of other applications, such as data reading sensors. It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising:
a write pole continuously extending from an air bearing surface (ABS); and
a side shield separated from the write pole on the ABS and continuously extending from the ABS, the side shield comprising a magnetic layer, magnetic guard layer, and non-magnetic layer, the magnetic layer and magnetic guard layer being dissimilar materials, the magnetic layer continuously extending from the ABS to a first plane, the magnetic guard layer extending to a second plane and separated from the magnetic layer by the non-magnetic layer that surrounds the magnetic guard layer, each plane extending parallel to the ABS with the first plane being farther from the ABS than the second plane.

2. The apparatus of claim 1, wherein the magnetic layer and magnetic guard layers have dissimilar magnetic flux densities.

3. The apparatus of claim 1, wherein magnetic guard layer has a uniform thickness along the ABS, the thickness measured perpendicular to the ABS.

4. The apparatus of claim 1, wherein the non-magnetic layer continuously extends to opposite sides of the magnetic guard layer.

5. The apparatus of claim 1, wherein the magnetic guard layer and magnetic layer are each separated from the write pole by a common gap distance.

6. The apparatus of claim 1, wherein the magnetic guard layer and magnetic layer are separated from the write pole dissimilar gap distances, the magnetic guard layer being farther from the write pole than the magnetic layer.

7. The apparatus of claim 1, wherein the non-magnetic layer is separated from the ABS by the magnetic layer.

8. The apparatus of claim 1, wherein the magnetic guard layer has a varying thickness.

9. An apparatus comprising a write pole continuously extending from an air bearing surface (ABS) and separated from a side shield by a first distance on the ABS and by a second distance distal the ABS, the first distance being smaller than the second distance, the side shield continuously extending from the ABS and comprising a magnetic layer, magnetic guard layer, and non-magnetic layer, the magnetic layer contacting the ABS, the magnetic guard layer separated from the magnetic layer by the non-magnetic layer that surrounds the magnetic guard layer, a transition surface in the magnetic layer transitions from the first distance to the second distance, the transition surface separated from the ABS.

10. The apparatus of claim 9, wherein the transition surface is oriented parallel to the ABS.

11. The apparatus of claim 9, wherein the transition surface is separated from the magnetic guard layer by the non-magnetic layer.

12. The apparatus of claim 9, wherein the magnetic guard layer has a varying width along a length of the magnetic guard layer.

13. The apparatus of claim 9, wherein the magnetic layer continuously extends from the ABS along orthogonal first and second sides of the magnetic guard layer.

14. The apparatus of claim 9, wherein the magnetic layer is separated into front and rear sections by a notch, the notch partially extending through the magnetic layer.

15. An apparatus comprising:
a write pole continuously extending from an air bearing surface (ABS); and
a side shield separated from the write pole by a first distance on the ABS and by a second distance distal the ABS, the first distance being smaller than the second distance, the side shield continuously extending from the ABS and comprising a magnetic layer, magnetic guard layer, first non-magnetic layer, and second non-magnetic layer, the magnetic layer contacting the ABS, the magnetic guard layer configured in an L shape and separated from the magnetic layer by the first non-magnetic layer, the magnetic guard layer continuously extends along orthogonal first and second sides of second non-magnetic layer, a transition surface in the magnetic layer transitions from the first distance to the second distance, the transition surface separated from the ABS.

16. The apparatus of claim 15, wherein the magnetic guard layer is surrounded by non-magnetic material.

17. The apparatus of claim 15, wherein the magnetic guard layer has a first thickness along a cross-track surface of the second non-magnetic layer and measured perpendicular to the ABS, the magnetic guard layer having a second thickness along a longitudinal surface of the second non-magnetic layer and measured parallel to the ABS, the first thickness being smaller than the second thickness.

18. The apparatus of claim 17, wherein the magnetic layer has a uniform third thickness as measured perpendicular to the ABS, the third thickness being greater than the respective first and second thicknesses.

19. The apparatus of claim 15, wherein the magnetic guard layer continuously extends along cross-track and longitudinal directions with respect to the write pole.

* * * * *